Sept. 11, 1956  F. E. ULLERY  2,762,479
ONE-WAY CLUTCHES
Filed Feb. 14, 1952  4 Sheets-Sheet 1

INVENTOR.
Fred E. Ullery

United States Patent Office 2,762,479
Patented Sept. 11, 1956

2,762,479
ONE-WAY CLUTCHES
Fred E. Ullery, Detroit, Mich.
Application February 14, 1952, Serial No. 271,550
38 Claims. (Cl. 192—45)

The inventions of this application relate to one-way rotatory clutches and brakes, herein called one-way devices, in which, in one relative direction, a plurality of jamming components jam on and frictionally grip a smooth circumferential surface of an annular race causing unitary rotation; but in the opposite direction, deflect from the jammed situation by frictional drag permitting nearly free relative rotation in that direction.

This one-way device is intended for installation in the toroidal core cavity of a hydrodynamic torque converter, therein to be interposed between the cores of bladed members of like character to render one, one-way rotatory relative to the other; objectively, to render the particular member one-way acting in ability to vectorially change the moment of momentum of the circulating fluid.

This application is a continuation-in-part of my pending applications: Serial No. 238,459, filed July 25, 1951; Serial No. 255,167, filed November 7, 1951; and, Serial No. 261,702, filed December 14, 1951. These prior applications are for certain torque converter inventions, the embodiments of which disclose some of the constructions of this particular one-way device, as well as various forms of connecting constructions.

These prior applications emphasize particular utility for specific usage of this one-way device: in the first and second applications named, there are embodiments in which this one-way device is interposed between certain turbine members, thereby effecting a humpback input speed curve which grants the power source unusual freedom to develop power in the torque conversion range, and avoiding certain shock head losses; the third-named application shows this one-way device interposed between two pump members, thereby providing a two-range pump entrance which avoids most of the large shock head losses usually entailed at a pump entrance; and, all three of these prior applications disclose this one-way device used with stator members, thereby obtaining large torque multiplication near stall, and preserving or even increasing efficiency near the coupling phase.

There are continuation-in-part applications relating to inventions which are partially disclosed herein. Those applications are: Serial No. 283,090, filed April 18, 1952; and Serial No. 286,117, filed May 5, 1952.

Also, there are other applications claiming inventions undisclosed herein, but using embodiments for settings which partially disclose inventions claimed in this application. Those applications are: Serial No. 298,560, filed July 12, 1952; and Serial No. 313,471, filed October 7, 1952.

In this application, unless otherwise stated, the terms used are as recommended and with the meaning as defined in Hydrodynamic Drive Terminology, pages 738–740 of the 1951 SAE Handbook, published by the Society of Automotive Engineers, Inc. Where optional terms are given, the first is considered preferable, and therefore is used in this specification.

The term, member, as used in this specification is restricted to mean a bladed member of a torque converter; such as, a pump member, a turbine member, or a stator member. Normally a member includes a shell element, a core element, and an array of blade elements extending between the shell and the core elements.

Kindred members are members of like character in the same torque converter; that is, a pump is kindred to any other pump member, a turbine is kindred to any other turbine member, and a stator is kindred to any other stator member.

The one-way device of this specification is used between the cores of two kindred members. For explanatory purposes, the basic construction of this one-way device may be considered as constituted of two principal components: an annular race which is rotationally fixed to the core of one of the kindred members, hereafter termed the race member; and encircling the race, an annular carriage which is rotationally secured to the other kindred member, hereafter termed the carriage member. Generally, it is most convenient to connect the race to the smaller member, and the carriage, to the larger of the two kindred members; however, pump members may be easily attached conversely.

Throughout this specification, this one-way device will be referred as being interposed between the cores of two kindred members. Only two are mentioned to avoid perplexity. Obviously, other kindred members may be appended to either one of the two members without changing the physical relation of the two particular members to each other.

A friction catch is a jamming subcombination of the carriage component of this one-way device. A friction catch subcombination includes: an abutment; fastening means to station the abutment with the carrier plates which shroud the sides of the carriage; a jamming component having a smooth gripping surface in contact with the outer surface of the race component, and having, outwards from that contact but slightly oblique to the radius thereat of the race, a reaction surface supported by the abutment; and, an urging means to urge the jamming component into the jamming situation between the abutment and the race. The oblique angle, between the race radius at the gripping surface contact and the line from that contact through the reaction center of support, should be an angle whose tangent is slightly less than the coefficient of friction of the gripping surface on the outer surface of the race.

Integral is used in this specification to describe a fixed association of an element or a structure relative to another, so that, the resultant structure is unitary, or is practically equivalent to a unitary structure; but it does not necessarily mean that the resultant structure was intact from its origin. It is used to clearly indicate a resultant structure that may be properly and practically processed intact from its origin, but without imposing the unjust limitation that it can not be otherwise—such a limitation would readily permit circumvention. For instance, a fabrication of stampings could be used in lieu of an integral casting or an integral stamping.

The objectives of this one-way device may be classified, as follows: the utilitarian objectives of aiding the achievement of superior characteristics of hydrodynamic torque converters, as stated in the references to the three prior applications, of which this specification is a continuation-in-part application; the attachment objectives relating to physical endowments of the appended member; and, the design objectives of the particular construction in consideration of the environment in the core cavity.

Some of the attachment objectives are, as follows: to render a member one-way acting by a core attainment, the member being otherwise inaccessible, or less conveniently approached; to radially carry and/or axially support a member by the same core attachment which renders it one-way acting; and, to join a one-way device to the core of a member of different thermal expansion without incurring harmful thermal stresses or distortions.

This one-way device has a specialized construction to render it appropriate for the particular circumstances. The design objectives may be most clearly revealed by reciting some of the specific advantages obtained.

As will be shown throughout this specification, the novel construction of this one-way device, besides being inexpensive, is physically favorable for usage in the core cavity: it effectively furnishes, with proportions compatible with the usual core cavity dimensions, the needed radial stiffness to support widely spaced jamming components; it is easily adaptable to the particular torque requirements, that is, for a torque converter using a plurality of these one-way devices, the quantity of jamming components stationed in each may be proportional to the respective torque requirements, the counterparts being the same except for minor departure; it annularly enshrouds the sides of the jamming components with side walls, which are externally smooth enough to avoid detrimental hydraulic disturbances, which with circumferential elements may fully enclose the array of jamming components to prevent excessive circulation through the passages between components, which may serve to axially contain and guide the jamming components, and which with properly located ports provides pressure balancing of axial forces; and, it is readily attachable, permitting convenient attachments for various applications. Also, with minor modifications of the basic construction, with or without a novel connecting structure, this one-way device may radially carry and/or axially support the appended member, as well as rendering it one-way acting.

For a one-way device utilizing friction-gripping jamming components, it is customary to employ two rings, one encircling the other, and to have as many jamming components as may be circumferentially spaced between the two rings. A large quantity of jamming components gives the required torque capacity with rings of small diameters, and according lowers the sliding velocity of the gripping surfaces for the overrunning operation. Also, a large quantity of closely spaced jamming components tends to stress the rings tangentially as hoops rather than in bending as beams, which serves to keep the radial deflections low, thus permitting lighter ring sections than would be required for widely spaced jamming components.

The one-way device of this specification has diametrical proportions which are unusually large, being in accordance with the core cavity dimensions. However, for usage in a torque converter core cavity, this large diameter does not entail excessive sliding velocities of the gripping surfaces when overrunning; each member is rotatory in at least one phase but only in the forward direction (that of pump members), and between the kindred members for which this one-way device is most advantageous, the differential speed is never large enough to cause an excessive sliding velocity of the gripping surfaces in spite of the large diameter. Furthermore, being submerged in oil under pressure, the gripping surfaces are kept lubricated, and are less susceptive to scuffing than those of most one-way devices.

Only a small quantity of jamming components is required in each of these one-way devices. Relative to proportions, the torque capacity required is rather low, and the gripping surfaces being active at a large radius, the total tangential gripping force is comparatively small; so, a small number of jamming components is adequate. Also, a small number is desirable to avoid more than moderate drag when overrunning, and as a matter of cost.

A diametrically stiff structure is required to properly support such a small quantity of widely spaced jamming components. The radial reaction of each jamming component is large relative to the tangential drive force obtained, usually being about 15 times larger. With the jamming components widely spaced, the circumferential supporting structure tends to be a series of beams in bending rather than a hoop tangentially stressed; consequently, a diametrically stiff structure is necessary to avoid excessive radial deflection.

A large encircling ring of the usual construction is difficult to produce accurately, as well as expensive; and to make it sufficiently stiff diametrically, would require a thick and heavy section, or supplementary reinforcement or support. In this one-way device, diametrical stiffness of the encircling component is obtained with an inexpensive, lightweight construction.

The basic construction of this one-way device comprises an annular ring, which is termed a race, and a carriage encircling the race. The race has a smooth circumferential surface which is radially outwards exposed to the jamming components. The carriage includes two coaxial carrier plates, preferably with concentric annular contours, and a plurality of friction catches interposed between the carrier plates, and located radially outward to, and circumferentially divided and spaced around, the race. Each friction catch has an abutment stationed and fixed with the carrier plates, for which fixation, axial pins through the carrier plates may be conveniently used. The carrier plates are axially spaced one from the other, and axially tied one to the other, usually by means of elements present for other functions; for instance, the friction catch abutments may be used as spacers, and the fixing pins thereof may be screws or headed pins to tie one carrier plate to the other; or, bearing slippers interposed between the carrier plates to radially maintain the race and the carriage concentric with each other, may be used as spacers, and the fastening pins for these slippers may be screws or headed pins to axially tie the carrier plates to each other.

The carrier plates are made with radially wide sections to effectively render the carriage diametrically stiff. It is desirable that the carrier plates have an outside diameter larger than the inside diameter by 25 per cent, or more—usually it may be 35 per cent. If desired, each carrier plate may be circumferentially flanged or ribbed to acquire a stiffer section, or to reduce section thickness and weight. For some installations, the carriage may be connected to the carriage member so as to obtain some support from that member.

These carrier plates annularly enshroud the sides of the jamming components. As will be apparent in the embodiments subsequently disclosed, the interior surfaces of these carrier plates are convenient means of axially containing and guiding the jamming components. The external surfaces are circumferentially smooth, and so permit relative rotation with oil, in which this one-way device is submerged, with little hydraulic drag and without serious turbulence.

Other advantages of the construction will be made apparent along the subsequent description of various embodiments.

The drawings of this specification show various embodiments of this one-way device with many modifications of the different components in combination for disclosure purposes. That is, each embodiment not only shows a modification of the friction catch, but also shows variations of other components; such as, urging means, carrier plate retention means, attaching constructions, and/or slippers. Many of these variations of components may be appropriately used in place of one another. Furthermore, certain features should be omitted for applications in which other means affords their particular function; for instance, if the race member and the carriage member are mounted concentric with each other and the particular constructions connect the race concentric with the race member and the carriage concentric with the carriage member, the slippers should be omitted inasmuch as the race and the carriage are otherwise maintained concentric with each other; similarly, if the race member and the carriage member are maintained axially located in the torque converter, and the particular constructions connect the race axially fixed to the race member and the carriage axially fixed to the carriage member, the thrust bearing feature between the race and the carriage should be omitted inasmuch as the race and the carriage are otherwise axially maintained in radial alignment with each other.

Each embodiment is disclosed with a transverse view at certain planes perpendicular to the axis of rotation, and radial section views as indicated radial planes passing through the axis of rotation or approximately so. Most of the transverse views are fragmentary of about one half of the periphery, but show the construction at three planes; namely, the exterior, the interior with a fragment of a carrier plate removed, and a mid-section through a friction catch and a slipper. In order to make the figures compact and uniform, each embodiment is shown spaced for six friction catches. The actual quantity used depends on the particular torque requirements; more than six may be used, but often three are adequate.

In the accompanying drawing:

Figure 16 is a transverse view of an embodiment illustrating a rocking-type friction catch construction, and also showing two slippers integral with each abutment, and axial slots of the carriage member core for tangentially keying the carriage thereto;

Figure 17 is a section approximately radial through a friction catch on line 17—17 of Figure 16;

Figure 18 is a transverse view of an embodiment having two rocking-type friction catches integral with each slipper, and also showing a bridge-type structure integral with the carriage member core for pinning the carriage thereto;

Figure 19 is a section approximately radial through a friction catch on line 19—19 of Figure 18, and indicating a laminated construction of the abutments and the slippers; and, Figure 20 is a radial section through the bridge-type core structure on line 20—20 of Figure 18.

Before describing any specific embodiment of this one-way device, it seems preferable to briefly illustrate some representative combinations with torque converters.

Figure 10:
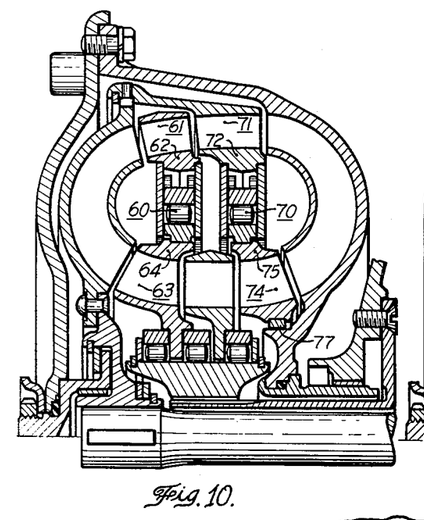
Figure 10 somewhat diagrammatically shows a radial section through a torque converter having one of these one-way devices between stator members, and another between turbine members.

Figure 10 diagrammatically shows a radial section through a torque converter having one of these one-way devices between two stator members, and another between two turbine members. One-way device 60 is interposed between the core 62 of the carriage stator member 61 and the core 64 of the race stator member 63. This one-way device prevents backward but permits forward rotation of member 61 relative to member 63, thus rendering member 61 capable of increasing but ineffective for reducing the moment of momentum of the circulating fluid, vectorially. Also, one-way device 60 radially carries and axially supports member 61 relative to member 63.

The other one-way device 70 is situated between the core 72 of the carriage turbine member 71 and the core 75 of the race turbine member 74 which is mounted on the radial bearing 77. As used here, this one-way device prevents forward but permits backward rotation of the member 74 relative to the member 71, thus rendering member 74 capable of reducing but ineffective for increasing the moment of momentum of the circulating fluid, vectorially. Also, one-way device 70 axially supports member 74 relative to member 71, and relative to member 74, radially stays member 71 which has considerable overhang from its principal support.

Normally, three friction catches furnish adequate torque capacity for a one-way device serving a small diameter member, such as one-way device 70 for race turbine member 74. Other factors being equal, a large member requires a proportionally larger torque capacity; accordingly, one-way device 60 for carriage stator member 61, may require six friction catches. As will be apparent in the embodiments disclosed, the particular carriage construction readily permits the quantity of friction catches employed to be in accordance with the respective torque requirements.

Figure 11:
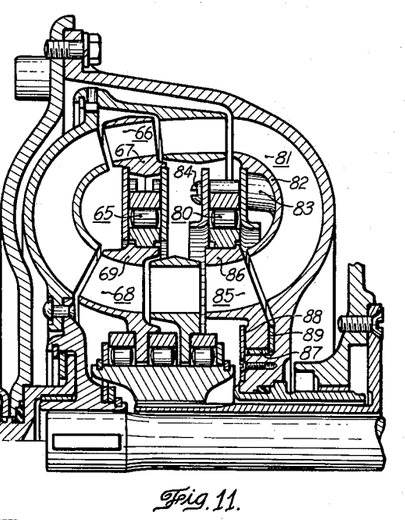
Figure 11 somewhat diagrammatically shows a radial section through a torque converter having one of these one-way devices between stator members, and another between pump members.

Figure 11 is a diagrammatic radial section of a torque converter having one of these one-way devices between two stator members, and another between two pump members, the arrangement for the stator members being like that for Figure 10. One-way device 65 is interposed between the core 67 of the carriage stator member 66 and the core 69 of the race stator member 68; whereby, preventing backward but permitting forward rotation of member 66 relative to member 68, and thus rendering member 66 capable of increasing but ineffective for reducing the moment of momentum of the circulating fluid, vectorially. Also, one-way device 65 radially carries and axially supports member 66 relative to member 68.

The other one-way device 80 is situated between the core 82 of the carriage pump member 81 and the core 86 of the race pump member 85. The attachment to the core 82 being screws 84 threaded into core bosses 83. The race pump member 85 is mounted on the carriage pump member 81 with radial bearing 87 and thrust bearings 88 and 89. However, as for the previously described arrangements, this radial bearing and/or these thrust bearings could be supplanted with comparable features of the one-way device. Here, one-way device 80 prevents backward but permits forward rotation of pump member 85 relative to pump member 81, thus rendering member 85 capable of increasing but ineffective for reducing the moment of momentum of the circulating fluid, vectorially.

The embodiment of this specification which is considered the preferred is that illustrated in Figures 1 to 4 incl., inasmuch as it is believed to be a combination of the most advantageous features, although for certain features, there are versions which are somewhat simpler and probably less expensive shown in subsequent embodiments. The construction which is most desirable depends on the environment of the particular application and production facilities.

Figures 1, 2:
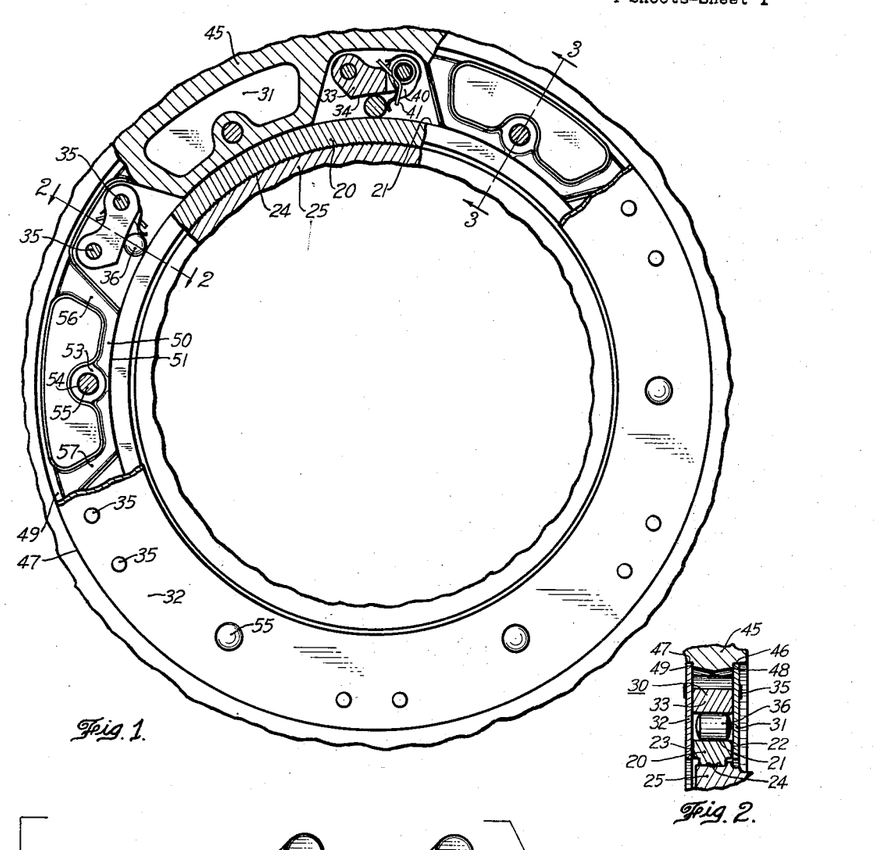
Figure 1 is a transverse view of the preferred embodiment particularly showing roller jamming components, hinged urging means, and bridge-type slipper structures integral with the core of the carriage member and pinned to the carriage.
Figure 2 is a radial section through a friction catch on line 2—2 of Figure 1.
Figure 3:
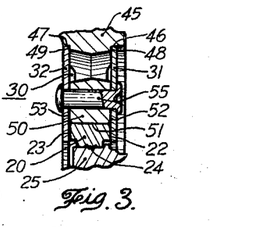
Figure 3 is a radial section through a slipper structure on line 3—3 of Figure 1.

In Figures 1, 2, and 3 of this preferred embodiment, the annular race 20 has a smooth outer surface 21, opposite side faces 22 and 23 which are smooth and square with the axis of rotation, and an inner surface with a narrow band of rolled serrations 24. This race is shrunk on the race member core 25 and thus firmly secured with the assistance of the serrations 24.

The carriage 30 has two annular carrier plates 31 and 32, axially spaced by slippers 50 (described later), and retained together by headed pins 55, thereby providing proper thrust bearing association of the race side faces 22 and 23 respectively with the inside faces of carrier plates 31 and 32.

Figure 4:
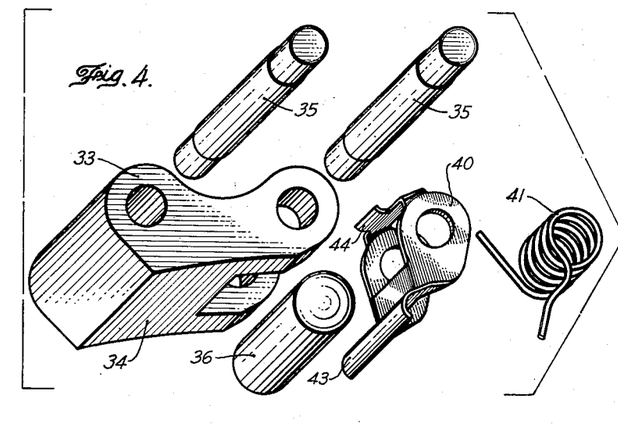
Figure 4 obliquely shows in exploded arrangement, enlarged parts of each friction catch of the embodiment of Figure 1.

As illustrated, this carriage has six friction catches, the separate elements of which are clearly illustrated in Figure 4. Each friction catch has an abutment 33 stationed between the carrier plates by two axial pins 35, so that the abutment cam surface 34 is obliquely disposed with the race outer surface 21 to bound a wedge-shape space therebetween, and in which a jamming component, a smooth cylindrical roller 36, is situated and axially retained by the carrier plates 31 and 32. Hinged on the axial pin 35 at the diverged end of the wedge-shape space, is an urging arm 40 which has a guide surface 43 to guide the roller 36, and a stop 44 to strike on the abutment and thus limit the travel of the arm. A torsion spring 41 wound around the same axial pin reacts on the abutment and causes the urging arm to urge the roller towards the converged end of the wedge-shape space.

The cylindrical roller has a reaction surface contact on the abutment cam surface, and a smooth gripping surface contact on the outer surface of the race, the reaction contact being outward from, but slightly oblique to the race radius at, the gripping surface contact. Thus, in response to a tendency for relative rotation between the race and the carriage in the jamming direction, the cylindrical roller jams on and frictionally grips the race causing unitary rotation of the race and the carriage; but for relative rotation in the opposite direction, the gripping surface deflects away from the jamming situation by frictional drag, permitting nearly free relative rotation in that direction.

The construction connecting the carriage and the carriage member core is clearly shown in Figures 1 and 3. Integral with the carriage member core 45, and extending inward between the carrier plates 31 and 32, and between the friction catches to the race 20, are bridge-type slipper structures, each having two circumferentially spaced struts 56 and 57, and a spanning slipper 50 which has an arcuate surface 51 concentric with core 45 and in radial bearing association with the race outer surface 21. Each slipper has an axial pin hole 54, lateral abutment surfaces 52 and 53 respectively in abutting association with the inside faces of carrier plates 31 and 32, and a headed pin 55 extending through the carrier plates. Thus, the carrier plates are axially spaced from, and tied to, each other; and, the carriage and the carriage member are rotationally united, axially located, and maintained concentric, with each other.

This bridge-type slipper construction is particularly advantageous if the coefficient of expansion of the carriage member material is considerably different from that of the carrier plate material, in that, the construction maintains uniform slipper bearing clearance with the race, and avoids excessive thermal stresses and distortions.

Also shown integral with the carriage member core 45 in Figures 1, 2, and 3, are ring pilots 46 and 47 respectively encircling the carrier plates 31 and 32, and lateral abutments 48 and 49 which are circumferentially continuous and respectively abut the carrier plates 31 and 32. For this particular embodiment, the ring pilots are not essential; but the circumferential abutments are desirable to practically seal the compartment between the carrier plates to thus avoid excessive fluid circulation radially between the carrier plates.

Figures 5, 6, 7, 8, 9:
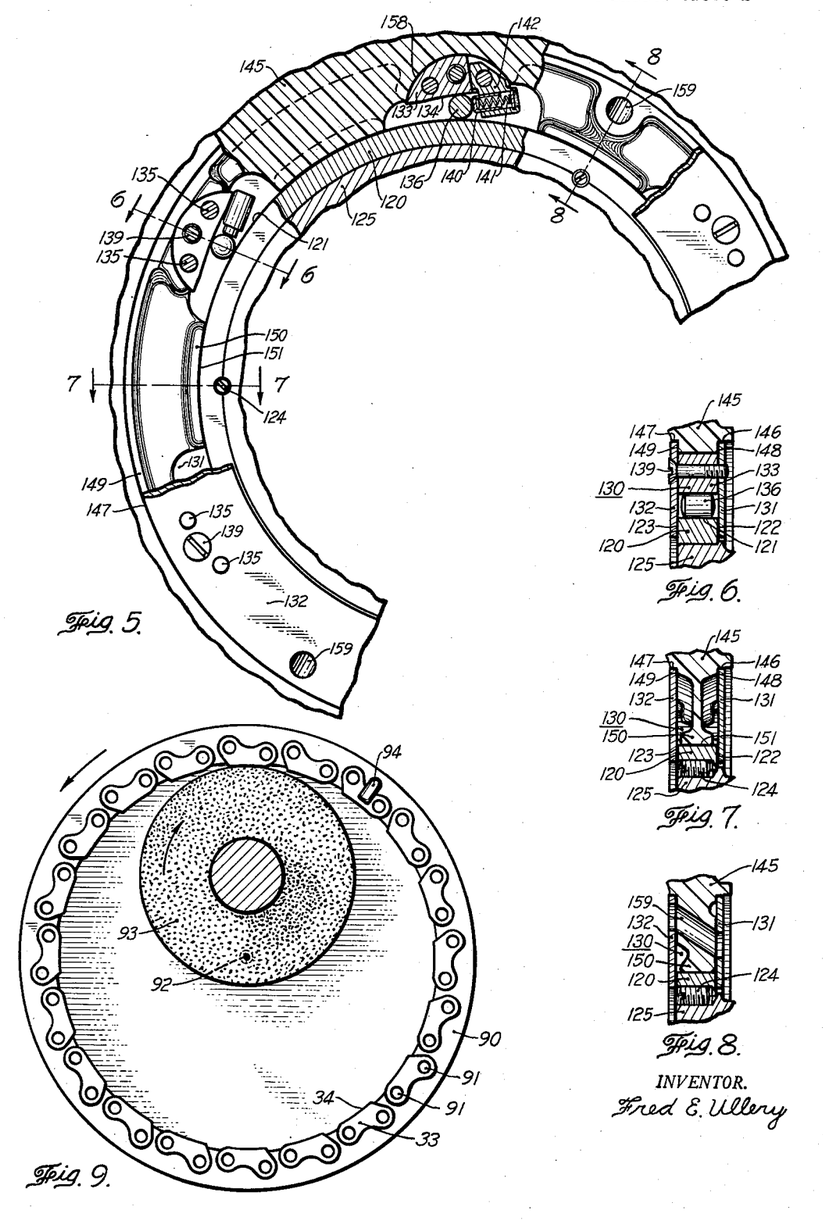
Figure 5 is a transverse view of an embodiment showing modifications of that of Figure 1, the departures including a coil spring urging means, axial slots of the carriage member core to tangentially key the carriage thereto, and rigid slippers integral with the carriage member core.
Figure 6 is a section almost radial through a friction catch on line 6—6 of Figure 5.
Figure 7 is a radial section through a slipper structure on line 7—7 of Figure 5.
Figure 8 is a radial section through an offset balancing port on line 8—8 of Figure 5.
Figure 9 is a diagrammatic illustration of a fixture for finishing the arcuate surfaces of the abutments shown in Figure 1.

The abutments 33 of this embodiment are devised so that the cam surface 34 of each abutment may be readily finished with a precision contour. This surface of each abutment is arcuate and runs out, that is, the circumferential continuation of the arcuate surface is entirely outside the confines of the abutment itself. So, the arcuate surface may be finished in a fixture with sustained rotation about the arcuate center. Figure 9 is a small scale, diagrammatic illustration of a fixture holding a multiplicity of these abutments. This fixture is a rotatory flanged drum 90 with two locating pins 91 for mounting each abutment 33 on the flange face of the drum, with the center of the arcuate surface 34 of each abutment 33 coincident with the drum axis of rotation 92. Each abutment is retained with suitable clamping means—clamp 94 for one abutment is exemplary. A grinding wheel 93 is shown for finish grinding. Similarly, a milling cutter may be used for the machining operation.

The preceding detailed description of the embodiment illustrated in Figure 1 partially explains the other embodiments. Each has a similar race and comparable carrier plates. Also, each functions according to the same jamming principle; each jamming component having a smooth gripping surface in contact with the outer surface of a race, and a reaction surface outward from, but slightly oblique to the race radius at, the gripping surface contact. For that reason and to avoid profuse repetition, the ensuing descriptions of the other embodiments will be restricted generally to the features which are distinctively different. Furthermore, for these other embodiments, comparable members, elements, and components are numbered with the same tenths and unitary digits as used for the embodiment of Figure 1, but preluded with a particular hundredths digit.

The embodiment illustrated in Figures 5, 6, and 7 has cam and roller friction catches with wedge-shape spaces between the cam and race surfaces somewhat like those of the embodiment of Figure 1, but has construction modifications, particularly concerning: the race retention, the carrier plate spacing and retention means, the urging device, and the carriage member core and slipper construction.

The race 120 is rotationally and axially secured to the race member core 125 by headless setscrews 124 axially across the cylindrical mating surface, the setscrew holes being drilled and tapped after the race is pressed on the core.

Each friction catch abutment 133 is stationed between the carrier plates 131 and 132 by two axial pins 135; the carrier plates being axially spaced from each other by the abutments as spacers, and tied to each other by flat-head screws 139, one through each abutment.

The urging device of each friction catch consists of a plunger housing 142 appended to the respective abutment 133, at the diverged end of the wedge-shape space, by the axial pin 135 at that end, a hollow plunger 140 slideable in the housing, and a coil spring 141 therein, causing the plunger to urge the respective roller 136 towards the converged end of the wedge-shape space. This urging device is interchangeable with the hinged-arm device shown in Figure 1. The plunger housings 142 are devised attachable to, rather than integral with, the abutments 133, so that, the abutment cam surfaces 134 may be readily finished in a fixture comparable to that illustrated in Figure 9.

The outer contour of each abutment 133 is approximately semi-circular to fit mating axial slots 158 integral with the carriage member core 145, thus tangentially keying the carriage 130 and the carriage member core 145 together. Being circular, the core slots 158 may be finished with a circular broach or a mill.

As illustrated in Figures 5 and 7, the slippers 150 are webbed structures integral with the carriage member core 145, each slipper having an arcuate surface 151 in radial bearing association with the race 120, thus maintaining the race and the carriage member concentric with each other.

Other features integral with the carriage member core 145 are: ring pilots 146 and 147 respectively encircling and maintaining the carrier plates 131 and 132 concentric with the carriage member; and, lateral abutments 148 and 149 which are circumferentially continuous, and respectively abut the inside faces of carrier plates 131 and 132, axially locating the carriage and the carriage member with each other, as well as sealing the compartment between the carrier plates.

The jamming components of the embodiments illustrated in Figures 1 and 5 have been mentioned as cylindrical rollers. Actually, they may be somewhat barrel-crowned, or balls may be used for light duty usage.

Figure 8 is a radial section through a radial-offset balancing port 159, two of which are shown diametrically opposite in Figure 5. Reference will be made to this particular exemplification in a later discussion of pressure balancing to avoid excessive thrust bearing loadings.

It is anticipated that eventually some torque converter members will be molded and/or fabricated of organic substances, commonly known as plastics. Most of the constructions shown for the carriage member cores would be desirable for such members because of the lateral and circumferential support afforded by the carrier plates. The core construction of this embodiment of Figure 5 may be properly used for metallic members, but is considered particularly favorable for members of plastic composition as indicated by the hatching of this particular core.

Figures 12, 15:
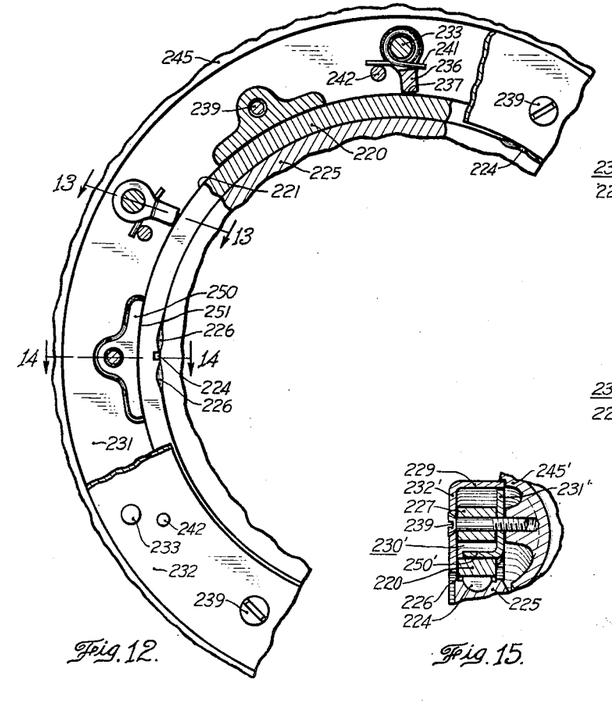
Figure 12 is a transverse view of an embodiment illustrating a hinged friction catch construction, and also showing separate slippers located with axial screws which attach the carriage to the carriage member core.
Figure 15 is a section comparable to Figure 14 but illustrating one integral form of slipper and carrier plate construction, and a flange pilot construction of the carrier plates.
Figure 13:
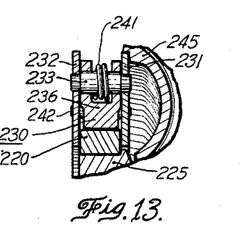
Figure 13 is a section approximately radial through a friction catch on line 13—13 of Figure 12.
Figure 14:
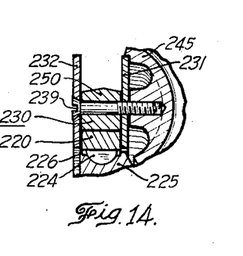
Figure 14 is a radial section through a slipper on line 14—14 of Figure 12.

Figures 12, 13, and 14 exemplify the following features embodied in a one-way device: a keyed race, hinged friction catches, attached slippers, and an axial form of attachment to the carriage member core.

The race 220 is secured to the race member core 225, rotationally by keys 224, and axially by peening 226 of the core stock over the edge of the race.

This particular friction catch construction consists of: an abutment which is a shouldered hinge pin 233 axially extending through the carrier plates 231 and 232; a jamming catch 236 hinged on the pin 233, and having a smooth gripping surface 237 which contacts and jams on the race outer surface 221 when the jamming catch swings towards, but before it attains, radial alignment with the race; and, a torsion spring 241 wound around the hinge pin 233, and which reacts on axial pin 242 through the carrier plates to urge the jamming catch 236 into the jamming situation with the race.

The carrier plates 231 and 232 are axially spaced by the slippers 250, each of which has an arcuate surface 251 in radial bearing association with race outer surface 221. Flat-head screws 239, one through each slipper, station the slippers, tie the carrier plates together, and connect the carriage 230 to the carriage member core 245.

Figure 15, a radial section comparable to that of Figure 14, shows several modifications of this embodiment of Figure 12. The same reference numbers are used, except that, those of modified elements are primed to indicate that they are not identical to those of Figure 14.

In Figure 15, the slippers 250' are formed integral with carrier plate 231', and separate spacers 227 are provided between carrier plates 231' and 232'. Flat head screws 239, one for each spacer, tie the carrier plates together, and connect the carriage 230' to the carriage member core 245'. Also, carrier plate 232' is formed with a flange 229 continuous around its periphery. This flange pilots and maintains carrier plate 231' concentric with carrier plate 232', and closes the compartment between them.

Figures 16, 17, 18, 19, 20:
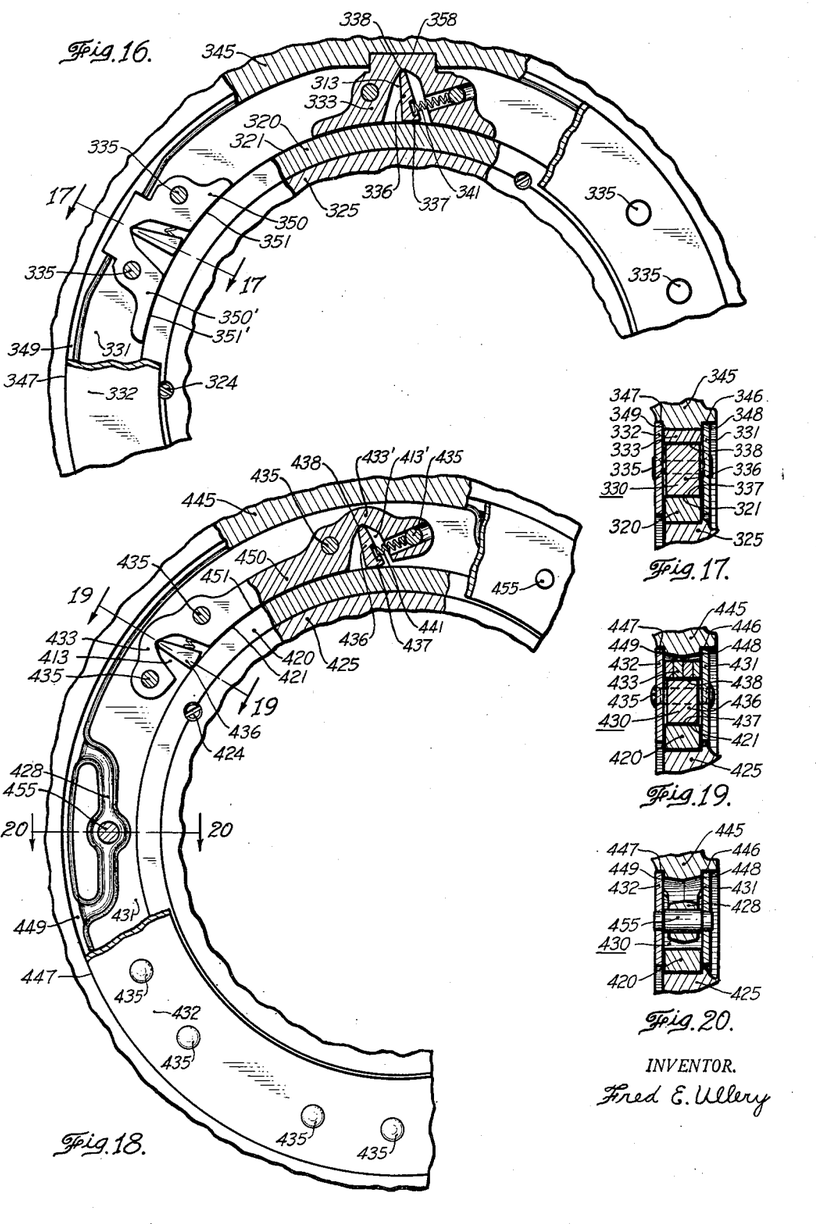

Figures 16 and 17 exemplify in a one-way device the following features: a friction catch with a rocking-type jamming catch supported in a notched abutment; two slippers integral with each abutment; and, a carriage member core having integral therewith, abutment keying slots, ring pilots, and circumferential abutments.

The carrier plates 331 and 332 are spaced apart by the abutments 333, and are tied together by the headed axial pins 335 which station the abutments therewith, two pins being used for each abutment. Integral with each abutment, are two slippers 350 and 350' having respective arcuate surfaces 350 and 351' in radial bearing association with the outer surface 321 of race 320.

Each abutment has a deep notch 313 containing and supporting a respective rocking-type jamming catch 336 which has a reaction surface 338 seated in the abutment notch, and a smooth gripping surface 337 to contact and jam on the race outer surface 321 when the jamming catch rocks towards, but before it attains, radial alignment with the race 320. A coil spring 341, holed in the abutment and reacting on one of the axial pins 335, urges the jamming catch 336 into the jamming situation.

Connecting features integral with the carriage member core 345 are as follows: axial slots 358, each tangentially keying one of the abutments 333; ring pilots 346 and 347 respectively encircling and centering carrier plates 331 and 332; and, circumferentially continuous abutments 348 and 349 respectively abutting and axially locating carrier plates 331 and 332.

Figures 18, 19, and 20 illustrate in a one-way device, the following features: two friction catch abutments integral with an intervening slipper; a carriage member core construction having bridge-type attachments, ring pilots, and circumferential abutments; and, a laminated form of abutment construction.

The carrier plates 431 and 432 are axially spaced by the integrated abutment structures, and are tied together by the headed pins 435, four of which station each abutment structure therewith.

Each integrated abutment structure has an abutment 433 at one end, another abutment 433' at the opposite end, and a connecting slipper 450 which has an arcuate surface 451 in radial bearing association with the outer surface 421 of the race 420. Abutments 433 and 433' have respective notches 413 and 413', each of which contains and supports a rocking-type jamming catch 436. Each jamming catch has a reaction surface 438 seated in a respective abutment notch, and a smooth gripping surface 437 to contact and jam on the race outer surface 421 when the jamming catch rocks towards, but before it attains, radial alignment with the race 420. A coil spring 441, holed in the respective abutment and reacting on one of the axial pins 435, urges the jamming catch 436 into the jamming situation.

The bridge-type connecting structures 428 integral with the carriage member core 445 permit thermal expansion thereof relative to the carriage 430. Each connecting structure 428 has an axial pin 455 extending through carrier plates 431 and 432, thus maintaining the carriage 430 and the carriage member core 445 concentric and rotationally united with each other. Accordingly, ring pilots 446 and 447, integral with the core 445, are not essential but may be included. The circumferential abutments 448 and 449, also integral with the core 445, respectively abut inside surfaces of carrier plates 431 and 432, and thus axially locate the carriage 430 and the carriage member core 445 with each other.

In Figure 19, a laminated formation of abutment 433 is indicated. That is, the abutment is a stack of stampings punched from sheet metal stock. These stampings are preferably united by welding or brazing into an integrated abutment which may be heat treated and precisely finished as a unitary part. This abutment, as well as those illustrated in Figures 1, 5, and 16, may be conveniently fabricated in this manner; however, some of them may be easily processed from rolled stock having a sectional contour like that of the particular abutment.

Each embodiment disclosed has a full complement of components combined into an operative one-way device. However, as stated in the preface to the description of these embodiments, each embodiment is used as a setting to illustrate modifications of several components, in order to render a compact disclosure of various friction catches, slippers, and connecting structures.

These various forms of components may be readily combined into the particular construction of this one-way device which is most suitable for the particular application, and which may be most conveniently produced with existing or available manufacturing facilities. For exemplification, some of the plausible variations of combinations, are as follows: the urging devices of Figures 1 and 5 are interchangeable; in place of the cam and roller friction catches of Figure 1, either the hinged friction catches of Figure 12, or the rocking-type friction catches of Figure 16 without abutment keys and without slippers, may be used; in lieu of the cam and roller friction catches of Figure 5, the rocking-type friction catches of Figure 16, without slippers and with adapted abutment keys, may be employed; and any one of the carriage and race combinations shown in Figures 1, 5, 16, and 18, may be axially connected to a carriage member core somewhat as shown in Figures 14 and 15.

In addition to the specific forms of connecting constructions illustrated, there are many forms of conventional constructions which may be used; for instance, that having screws or rivets through mating flanges between the race and the race member core, or between the carrier plates and the carriage member core.

Various forms of axial pins have been disclosed for locating and stationing the friction catch abutments and the slippers with the carrier plates. Obviously, there are many other fastening means which may be appropriately used for certain abutments or slippers; such as, tenons, keys, lugs, flanges, pockets, etc. In some cases, the abutments or the slippers may be welded to, or integrated with, at least one of the carrier plates.

In order to disclose various forms of slipper constructions without additional drawings, a variation of slipper construction is included in each embodiment of this one-way device. But, as previously stated, where a one-way device is used between kindred members which are otherwise maintained concentric with each other, the slipper components of the particular one-way device should be omitted. If the omitted slippers were also used for axially spacing the carrier plates, either the friction catch abutments may be utilized as spacers, or a simple form of spacer may be substituted, as shown in Figure 15. If the omitted slippers were associated with the carriage member connecting structure as in Figure 1, a comparable construction, such as the bridge-type structures 428 of Figure 18, may be substituted.

Likewise, where a one-way device is used between kindred members which are otherwise maintained axially located, the thrust bearing association between the race and the carrier plates should be omitted. The race may be made somewhat axially shorter to give ample axial clearance relative to the carrier plate faces, or the carrier plates may be made with an inside diameter larger than the outside diameter of the race. Rather than blanking the carrier plates with an inside diameter larger than the race, it is preferable to flange outwardly the stock of the carrier plates to radial clear the race, thus eliminating the thrust bearing association, but without sacrificing diametrical stiffness of the carrier plates. Obviously, with a widened race these flanges may be in radial bearing association with the outer surface of the race in lieu of slippers.

For the bearing associations of the slippers radially with the race, and of the carrier plates axially with the race, special bearing materials may be used if desired; however, such materials are usually unnecessary, but it is good practice to give one of the mating surfaces of each bearing an anti-scuff treatment. The surfaces are well lubricated, being immersed in oil; and, with due consideration of certain factors, the bearing unit loadings may be held to rather low values. The radial bearing load of an appended member is, of course, quite small if the member is properly balanced. The thrust bearing load of an appended member when overrunning is low, or can be balanced to a low value: that of an appended race member is generally low; and that of an appended carriage member may be pressure balanced to a reasonable value by appropriate ports of the carriage of this one-way device.

For each appended overrunning member, the factors causing unbalanced axial thrust forces should be given specific consideration, and proper ports should be provided to balance or partially offset the extreme thrust conditions. Some of these factors will be mentioned, and the general nature of balancing ports will be briefly described.

When the appended member is overrunning, it is not changing the moment of momentum; accordingly, the blade reactions of the appended member are approximately balanced. However, there are fluid pressure differentials in the fluid circuit and around the shell and core shrouds which may cause axial forces of considerable magnitude. If the fluid passage through the appended member has, from entrance to exit, a radial as well as an axial trend, there will be a change in pressure. Likewise, an area change of the passage will cause a pressure difference at the opposite sides. Also, projected areas of the shell and core shrouds are usually exposed to different fluid pressures.

The construction of the one-way device of this specification divides the core cavity of the torque converter into separate compartments. Frequently, adjacent compartments may be balanced by ports axially through the carriage of the particular one-way device. However, the pressure in each compartment varies radially according to the centrifugal pressure attending the particular circumferential velocity of the fluid. Accordingly, if the pressures are balanced in the adjacent compartments at different radial distances, by ports having a radial offset, the average pressure in one compartment may be higher than that in the other compartment; thus causing an axial force to balance or partially offset the resultant of axial forces mentioned in the preceding paragraph. In Figure 8, one form of an offset port 159 is illustrated. As the rotational speed of the carriage changes, the radial offset influence of the port varies; hence, it may be used to balance certain conditions which are existent only in a particular phase range of operation.

In the preceding disclosure, the basic construction, and various modifications of the components, of this one-way device have been clearly shown. The unusual circumstances and complications encountered for the particular usage in the core cavity of a hydrodynamic torque converter have been fully disclosed and discussed. It has been shown that the novel construction of this one-way device is, not only suitable and practical for this particular usage, but is remarkably appropriate in every respect for this unusual environment in the core cavity.

Also, it has been shown that the basic construction, with minor modifications, may not only render one member one-way rotatory relative to a kindred member, but may radially carry one by the other, and/or axially support one by the other.

Furthermore, a novel connecting construction, which avoids harmful thermal stresses and distortions of the carriage member and the carriage component of this one-way device, has been disclosed.

So far as is known, this invention is the first embodiment of a friction catch type of one-way device having physical characteristics which are practical and appropriate for the unusual requirements in the core cavity of a hydrodynamic torque converter. As indicated early in this specification, this invention renders practical, the achievement of various superior characteristics in hydrodynamic torque converters. Hence, this invention is claimed generically and with plural species.

Also, the following subcombinations, each with supplementary definitions, are claimed:

1. The carriage structure of this one-way device.
2. The subcombination of a friction catch abutment, and an urging device, the abutment having an arcuate cam surface which may be conveniently finished with sustained rotation about the arcuate center.
3. The carriage member core construction having integral slippers and certain features of the connecting structures.

It is, of course, understood that the present invention is not limited to the particular forms and structures shown in the drawings, or otherwise revealed, for disclosure and explanatory purposes, but also embraces modifications within the scope of the appended claims.

I claim:

1. In a hydrodynamic torque converter having bladed-members including two kindred members arranged in a toroidal fluid circuit and having in the core cavity thereof a one-way device interposed between bores of two kindred members, the combination comprising: an annular race having a smooth outer surface; a carriage encircling said race, said race and said carriage together having radial proportions to abide in an annular inclosure of which the inner diameter is larger than one-half of the outer diameter, said carriage including two coaxial carrier plates spaced apart to shroud the carriage annular space therebetween and around said race outer surface, means to retain said carrier plates in axially spaced relation with each other, and a plurality of friction catches including abutments thereof stationed with said carrier plates, said friction catches and said abutments thereof being circumferentially distributed constructions stationed within and restricted to a plurality of circumferentially spaced-apart sectors of said carriage annular space, said friction catches being operative to effect one-way frictional gripping of said race outer surface and to thus render said race and said carriage, one to the other, one-way rotatory; radial support means to maintain said race and said carriage concentric with each other; axial support means to maintain said race and said carriage in radial alignment with each other; carriage attaching means adapted to connect said carriage with the core of one of said two kindred members, that member thus being the carriage member; and, means adapted to secure said race with the core of the other of said two kindred members.

2. The combination defined in claim 1 in which said radial support means includes a plurality of slippers situated in said carriage annular space and circumferentially interspaced between said friction catches, each of said slippers having an arcuate surface concentric with said carrier plates and in radial bearing association with said race outer surface, and means to radially and circumferentially station said slippers with said carriage.

3. The combination defined in claim 1 in which said axial support means includes thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

4. The combination defined in claim 1 in which said radial support means, and said axial support means include: a plurality of slippers situated in said carriage annular space and circumferentially interspaced between said friction catches, each of said slippers having an arcuate surface concentric with said carrier plates and in radial bearing association with said race outer surface, and means to radially and circumferentially station said slippers with said carriage; and, thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

5. In a one-way device for placement and use in the toroidal core cavity of a hydrodynamic torque converter between core elements of two kindred bladed-members thereof, and in which a plurality of friction catches including jamming components thereof are circumferentially distributed and spaced around a smooth outer surface of an annular race, a carriage construction comprising: two coaxial carrier plates of annular form and of radial proportions to abide in an annular inclosure of which the inner diameter is larger than one-half of the outer diameter, said carrier plates being spaced apart to shroud the carriage annular space therebetween; means to retain said carrier plates in axially spaced relation with each other; a plurality of friction catch abutments, said abutments being a plurality of circumferentially distributed structures stationed within and restricted to a plurality of circumferentially spaced-apart sectors of said carriage annular space, each of said abutments having a support surface to retain and resist a jamming component, said support surface having a portion thereof facing a direction which is an oblique direction relative to that towards the carriage axis of rotation to resist in the oblique direction reaction of a jamming component; and, means to station each of said abutments with said carrier plates.

6. The combination defined in claim 5 in which said friction catch abutments include: the feature of said support surface of each of said abutments being an arcuate surface disposed with the arcuate center thereof slightly offset from said carriage axis of rotation, and the feature of each of said abutments having its physical confines outside the circumferential continuation of its said arcuate surface to permit manufacture processing of its said arcuate surface with sustained rotation about the center thereof.

7. The combination defined in claim 5 in which each one of a plurality of said friction catch abutments includes an integral slipper, each of said slippers having an arcuate surface concentric with said carrier plates and radially disposed for radial bearing association with a said race outer surface.

8. The combination defined in claim 5 and including a plurality of slippers situated in said carriage annular space and circumferentially interspaced between said friction catch abutments, each of said slippers having an arcuate surface concentric with said carrier plates and radially disposed for radial bearing association with a said race outer surface, and means to radially and circumferentially station each slipper with said carrier plates.

9. In a hydrodynamic torque converter having bladed-members including two kindred members arranged in a toroidal fluid circuit and having in the core cavity thereof a one-way device interposed between cores of two kindred members, the combination comprising: an annular race having a smooth outer surface; a carriage encircling said race, said race and said carriage together having radial proportions to abide in an annular inclosure of which the inner diameter is larger than one half of the outer diameter, said carriage including two coaxial carrier plates spaced apart to shroud the carriage annular space therebetween and around said race outer surface, means to retain said carrier plates in axially spaced relation with each other, and a plurality of friction catches including abutments thereof stationed with said carrier plates, said friction catches and said abutments thereof being circumferentially distributed constructions stationed within and restricted to a plurality of circumferentially spaced-apart sectors of said carriage annular space; each of said friction catches including one of said abutments each of which has an inward facing cam surface obliquely disposed apart from said race outer surface to form a wedge-shape space therebetween, abutment fastening means to station said abutment with said carrier plates, a smooth cylindrical roller axially disposed in said wedge-shape space, and urging means to urge said roller into a jamming situation in said wedge-shape space, said friction catches thus being operative to effect one-way frictional gripping of said race outer surface to render said race and said carriage, one to the other, one-way rotatory; radial support means to maintain said race and said carriage concentric with each other; axial support means to maintain said race and said carriage in radial alignment with each other; carriage attaching means adapted to connect said carriage with the core of one of said two kindred members, that member thus being the carriage member; and, means adapted to secure said race with the core of the other of said two kindred members.

10. The combination defined in claim 9 in which said abutments include: the feature of said cam surface of each of said abutments being an arcuate surface disposed with the arcuate center thereof slightly offset from the carriage axis of rotation, and the feature of each of said abutments having its physical confines outside the circumferential continuation of its said arcuate surface to permit manufacture processing of its said arcuate surface with sustained rotation about the center thereof.

11. The combination defined in claim 9 in which said abutments, said abutment fastening means, and said urging means include: the feature of said cam surface of each of said abutments being an arcuate surface disposed with the arcuate center thereof slightly offset from the carriage axis of rotation, and the feature of each of said abutments having its physical confines outside the circumferential continuation of its said arcuate surface to permit manufacture processing of its said arcuate surface with sustained rotation about the center thereof; a plurality of axial pins extending through each of said abutments and said carrier plates; and, appended to each of said abutments near the diverged end of a said wedge-shape space, an urging arm hinged on, and a torsion spring wound around, one of said axial pins, said arm having a roller-guide surface at its free end, and said spring being operative to cause said arm to urge a said roller towards the converged end of a said wedge-shape space.

12. The combination defined in claim 9 in which said radial support means includes a plurality of slippers situated in said carriage annular space and circumferentially interspaced between said friction catches, each of said slippers having an arcuate surface concentric with said carrier plates and in radial bearing association with said race outer surface, and means to radially and circumferentially station said slippers with said carriage.

13. The combination defined in claim 9 in which said radial support means, and said carriage attaching means include: a plurality of slipper structures integral with the core of said carriage member and circumferentially interspaced between said friction catches, each of said slipper structures extending radially inward across said carriage annular space and having an arcuate surface in radial bearing association with said race outer surface and concentric with said carriage member; and, means to maintain said carriage and said carriage member concentric with each other.

14. The combination defined in claim 9 in which said radial support means, and said carriage attaching means include: a plurality of slipper structures integral with the core of said carriage member and circumferentially interspaced between said friction catches, each of said slipper structures being a bridge-like structure having two circumferentially spaced struts extending inward across said carriage annular space and a spanning slipper, each of said slippers having an arcuate surface in radial bearing association with said race outer surface and concentric with said carriage; and, a plurality of pins to station said slippers with said carriage, each pin extending axially through said carrier plates and a mid-section of one of said slippers.

15. The combination defined in claim 9 in which said axial support means includes thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

16. The combination defined in claim 9 in which said radial support means, and said axial support means include: a plurality of slippers situated in said carriage annular space and circumferentially interspaced between said friction catches, each of said slippers having an arcuate surface concentric with said carrier plates and in radial bearing association with said race outer surface, and means to radially and circumferentially station said slippers with said carriage; and, thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

17. The combination defined in claim 16 in which said abutments include: the feature of said cam surface of each of said abutments being an arcuate surface disposed with the arcuate center thereof slightly offset from the carriage axis of rotation, and the feature of each of said abutments having its physical confines outside the circumferential continuation of its said arcuate surface to permit manufacture processing of its said arcuate surface with sustained rotation about the center thereof.

18. The combination defined in claim 16 in which said abutments, said abutment fastening means, and said urging means include: the feature of said cam surface of each of said abutments being an arcuate surface disposed with the arcuate center thereof slightly offset from the carriage axis of rotation, and the feature of each of said abutments having its physical confines outside the circumferential continuation of its said arcuate surface to permit manufacture processing of its said arcuate surface with sustained rotation about the center thereof; a plurality of axial pins extending through each of said abutments and said carrier plates; and, appended to each of said abutments near the diverged end of a said wedge-shape space, an urging arm hinged on, and a torsion spring wound around, one of said axial pins, said arm having a roller-guide surface at its free end, and said spring being operative to cause said arm to urge a said roller towards the converged end of a said wedge-shape space.

19. In a hydrodynamic torque converter having bladed-members including two kindred members arranged in a toroidal fluid circuit and having in the core cavity thereof a one-way device interposed between cores of two kindred members, the combination comprising: an annular race having a smooth outer surface; a carriage encircling said race, said race and said carriage together having radial proportions to abide in an annular inclosure of which the inner diameter is larger than one half of the outer diameter, said carriage including two coaxial carrier plates spaced apart to shroud the carriage annular space therebetween and around said race outer surface, means to retain said carrier plates in axially spaced relation with each other, and a plurality of friction catches including abutments thereof stationed with said carrier plates, said friction catches and said abutments thereof being circumferentially distributed constructions stationed within and restricted to a plurality of circumferentially spaced-apart sectors of said carriage annular space, said friction catches being operative to effect one-way frictional gripping of said race outer surface and to thus render said race and said carriage, one to the other, one-way rotatory; axial support means to maintain said race and said carriage in radial alignment with each other; a carriage attaching construction adapted to associate said carriage with the core of one of said kindred members, that member thus being the carriage member, said carriage attaching construction including a plurality of slipper structures integral with said core of said carriage member and circumferentially interspaced between said friction catches, each of said slipper structures extending radially inward across said carriage annular space and having an arcuate surface in radial bearing association with said race outer surface and concentric with said carriage member, and means to maintain said carriage and said carriage member concentric and rotationally stationed with each other; and, means adapted to secure said race with the core of the other of said two kindred members.

20. The combination defined in claim 19 in which said carriage attaching construction includes two opposing lateral abutments integral with said carriage member core and disposed to effect an abutting surface association with an inside surface of each of said carrier plates to thus maintain said carriage and said carriage member axially located with each other.

21. The combination defined in claim 19 in which said carriage attaching construction includes two opposing lateral abutments integral with and continuous around said carriage member core and disposed to effect a circumferentially-continuous abutting surface association with an inside surface of each of said carrier plates to thus provide hydraulic seals therebetween and to maintain said carriage and said carriage member axially located with each other.

22. The combination defined in claim 19 in which said carriage attaching construction includes: the feature of each of said slipper structures being a bridge-like structure having two circumferentially-spaced inwardly-extending struts and a spanning slipper element; and, a plurality of pins to station said slipper elements with said carriage, each pin extending axially through said carrier plates and a mid-section of one of said slipper elements.

23. The combination defined in claim 19 in which said axial support means includes thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

24. In a one-way device for placement and use in the toroidal core cavity of a hydrodynamic torque converter between core elements of two kindred bladed-members thereof, and in which a plurality of friction catches including jamming components are circumferentially distributed and spaced around a smooth outer surface of an annular race, a friction catch subcombination comprising: an abutment having an arcuate surface for disposition apart from said race outer surface with the centers of said surfaces slightly offset to thus form between said surfaces a wedge-shape space in which to confine a round section form of a said jamming component, said abutment having its physical confines outside the circumferential continuation of its said arcuate surface to permit manufacture processing of its said arcuate surface with sustained rotation about the center thereof; and, urging means associated with said abutment to urge a said jamming component into a jamming situation in a said wedge-shape space.

25. The combination defined in claim 24 in which said abutment and said urging means include a construction having a spring actuated urging arm hinged near the end of said abutment where a said wedge-shape space is diverged, said construction including an urging arm, matching yoke and eye hinge adaptations of said abutment and said urging arm, a hinge pin, and a torsion spring wound around said hinge pin, said arm having at its free end a surface for guiding and urging a said jamming component, and said spring being operative to cause said arm to urge a said jamming component toward the converged end of a said wedge-shape space.

26. In a hydrodynamic torque converter in which the bladed-members arranged in a toroidal fluid circuit include two kindred members which are associated one to the other by a one-way device having an annular race component associated with a core element of one and a carriage component associated with a core element of the other of said two kindred members, the last-named thus being the carriage member, and in which said carriage component of a said one-way device has two coaxial carrier plates of annular form retained in spaced relation to shroud a carriage annular space therebetween and around a smooth outer surface of said race component, a subcombination of a carriage attaching construction comprising: a plurality of circumferentially spaced slipper structures integral with a said carriage member core element and disposed to extend radially inward through a said carriage annular space, each slipper structure having at its radially innermost location an arcuate surface centered about the axis of said carriage member and radially disposed for a radial bearing association with a said race outer surface.

27. The construction defined in claim 26 in which said carriage member core element includes two opposing lateral abutments integral therewith and disposed to effect an abutting surface association with an inside surface of each of two said carrier plates to thus maintain a said carriage and a said carriage member axially located with each other.

28. The construction defined in claim 26 in which said carriage member core element includes two opposing lateral abutments of continuous-circular form integral therewith and disposed to effect a circumferentially-continuous abutting surface association with an inside surface of each of two said carrier plates to thus provide hydraulic seals therebetween and to maintain a said carriage and a said carriage member axially located with each other.

29. The construction defined in claim 26 in which said slipper structures include: the feature of each of said slipper structures being a bridge-like structure having two circumferentially-spaced inwardly-extending struts and a spanning slipper element, and the feature of each of said slipper elements having an axial pin hole through its mid-section for the containment of a mating pin extending axially through two said carrier plates to therewith station said slipper elements and thus to maintain a said carriage and a said carriage member concentric and rotationally united.

30. In a hydrodynamic torque converter having bladed-members including two kindred members arranged in a toroidal fluid circuit and having in the core cavity thereof a one-way device interposed between cores of two kindred members, the combination comprising: an annular race having a smooth outer surface; a carriage encircling said race, said race and said carriage together having radial proportions to abide in an annular inclosure of which the inner diameter is larger than one half of the outer diameter, said carriage including two coaxial carrier plates spaced apart to shroud the carriage annular space therebetween and around said race outer surface, means to retain said carrier plates in axially spaced relation with each other, and a plurality of friction catches including abutments thereof stationed with said carrier plates, said friction catches and said abutments thereof being circumferentially distributed constructions stationed within and restricted to a plurality of circumferentially spaced-apart sectors of said carriage annular space; each of said friction catches including one of said abutments each of which has a deep notch axially across said abutment and open towards the axis of rotation, fastening means to station said abutment with said carrier plates, a jamming catch having at its outer end a rocking seat in said abutment notch and at its inner end a smooth gripping surface to contact said race outer surface when said jamming catch rocks towards but before it attains radial disposition, and a spring operative to urge said jamming catch towards radial disposition to urge a jamming situation, said friction catches thus being operative to effect one-way frictional gripping of said race outer surface to render said race and said carriage, one to the other, one-way rotatory; radial support means to maintain said race and said carriage concentric with each other; axial support means to maintain said race and said carriage in radial alignment with each other; carriage attaching means adapted to connect said carriage with the core of one of said two kindred members, that member thus being the carriage member; and, means adapted to secure said race with the core of the other of said two kindred members.

31. The combination defined in claim 30 in which said radial support means includes a plurality of slippers situated in said carriage annular space and circumferentially interspaced between said jamming catches, each of said slippers having an arcuate surface concentric with said carrier plates and in radial bearing association with said race outer surface, and means to radially and circumferentially station said slippers with said carriage.

32. The combination defined in claim 30 in which said radial support means includes a plurality of slippers integral with said abutments, the structure of each one of a plurality of said abutments including a said integral slipper having an arcuate surface concentric with said carrier plates and in radial bearing association with said race outer surface.

33. The combination defined in claim 30 in which said axial support means includes thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

34. The combination defined in claim 30 in which said radial support means, and said axial support means include: a plurality of slippers situated in said carriage annular space and circumferentially interspaced between said jamming catches, each of said slippers having an arcuate surface concentric with said carrier plates and in radial bearing association with said race outer surface, and means to radially and circumferentially station said slippers with said carriage; and, thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

35. In a hydrodynamic torque converter having bladed-members including two kindred members arranged in a toroidal fluid circuit and having in the core cavity thereof a one-way device interposed between cores of two kindred members, the combination comprising: an annular race having a smooth outer surface; a carriage encircling said race, said race and said carriage together having radial proportions to abide in an annular inclosure of which the inner diameter is larger than one half of the outer diameter, said carriage including two coaxial carrier plates spaced apart to shroud the annular carriage space therebetween and around said race outer surface, means to retain said carrier plates in axially spaced relation with each other, and a plurality of friction catches including abutments thereof stationed with said carrier plates, said friction catches and said abutments thereof being circumferentially distributed constructions stationed within and restricted to a plurality of circumferentially spaced-apart sectors of said carriage annular space; each of said friction catches including one of said abutments each of which is a hinge pin extending axially across said carriage annular space, fastening means to station said hinge pin with said carrier plates, a jamming catch having its outer end pivoted on said hinge pin and at its inner end a smooth gripping surface to contact said race outer surface when said jamming catch swings towards but before it attains radial disposition, and a spring operative to urge said jamming catch towards radial disposition to urge a jamming situation, said friction catches thus being operative to effect one-way frictional gripping of said race outer surface to render said race and said carriage, one to the other, one-way rotatory; radial support means to maintain said race and said carriage concentric with each other; axial support means to maintain said race and said carriage in radial alignment with each other; carriage attaching means adapted to connect said carriage with the core of one of said two kindred members, that member thus being the carriage member; and, means adapted to secure said race with the other of said two kindred members.

36. The combination defined in claim 35 in which said radial support means includes a plurality of slippers situated in said carriage annular space and circumferentially interspaced between said friction catches, each of said slippers having an arcuate surface concentric with said carrier plates and in radial bearing association with said race outer surface, and means to radially and circumferentially station said slippers with said carriage.

37. The combination defined in claim 35 in which said axial support means includes thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

38. The comibnation defined in claim 35 in which said radial support means, and said axial support means include: a plurality of slippers situated in said carriage annular space and circumferentially interspaced between said friction catches, each of said slippers having an arcuate surface concentric with said carrier plates and in radial bearing associations with said race outer surface, and means to radially and circumferentially station said slippers with said carriage; and, thrust bearing associations of side surfaces of said race and said carrier plates, said race having opposite side surfaces thereof smooth and square with the axis of rotation, and said carrier plates having opposing inside surfaces contiguous respectively with said race side surfaces to effect thrust bearing associations therewith.

(References on following page)

References Cited in the file of this patent

UNITED STATES PATENTS

| | | | |
|---|---|---|---|
| 1,692,130 | Long | Nov. 28, | 1928 |
| 1,921,721 | Batterman | Aug. 8, | 1933 |
| 1,965,518 | Wilson | July 3, | 1934 |
| 2,044,197 | Barthel | June 16, | 1936 |
| 2,069,558 | Rauen | Feb. 2, | 1937 |
| 2,172,653 | Flogaus | Sept. 12, | 1939 |
| 2,173,604 | Dodge | Sept. 19, | 1939 |
| 2,293,767 | Salerni | Aug. 25, | 1942 |
| 2,562,196 | Lewis | July 31, | 1951 |
| 2,599,793 | Warner | June 10, | 1952 |
| 2,630,682 | Wemp | Mar. 10, | 1953 |